(12) United States Patent
Martin et al.

(10) Patent No.: US 8,286,378 B2
(45) Date of Patent: Oct. 16, 2012

(54) ADVANCED PHOTOLUMINESCENT COMPONENTS AND FORMULATION/FABRICATION METHODS FOR PRODUCTION THEREOF

(75) Inventors: Richard James Martin, Delaplane, VA (US); Gregory Louis Bender, Alexandria, VA (US); Thomas Wells Brignall, Jr., Marcellus, MI (US); Herbert George Jones, Elkton, MD (US)

(73) Assignee: Afterglow, LLC., Manassas Park, VA (US)

( * ) Notice: Subject to any disclaimer, the term of this patent is extended or adjusted under 35 U.S.C. 154(b) by 0 days.

(21) Appl. No.: 13/419,118

(22) Filed: Mar. 13, 2012

(65) Prior Publication Data
US 2012/0233895 A1   Sep. 20, 2012

Related U.S. Application Data

(60) Provisional application No. 61/452,326, filed on Mar. 14, 2011.

(51) Int. Cl.
*G09F 13/20*   (2006.01)

(52) U.S. Cl. .......................................... 40/542; 313/486
(58) Field of Classification Search .................... 40/542
See application file for complete search history.

(56) References Cited

U.S. PATENT DOCUMENTS

| | | | |
|---|---|---|---|
| 2005/0186443 A1* | 8/2005 | Marrocco et al. | 428/690 |
| 2010/0136302 A1* | 6/2010 | Comanzo et al. | 428/195.1 |

* cited by examiner

*Primary Examiner* — Joanne Silbermann
(74) *Attorney, Agent, or Firm* — Oblon, Spivak, McClelland, Maier & Neustadt, L.L.P.

(57) ABSTRACT

A photoluminescent device and a photoluminescent exit sign. The photoluminescent device includes a polymer matrix having a light-emitting exterior surface for emission of photoluminescent light therefrom. The photoluminescent device has a plurality of UV or visible-light excited phosphor particles included in the polymer matrix. The phosphor particles have a concentration greater in an exterior region of the polymer matrix proximate the light-emitting exterior surface than in an interior region of the polymer matrix. The exit sign includes at least two plates interlocked together with at least one typographical character disposed on the plates. The typographical character is formed from the polymer matrix containing the phosphor particles.

30 Claims, 9 Drawing Sheets
(7 of 9 Drawing Sheet(s) Filed in Color)

Figure 6A
Figure 6B
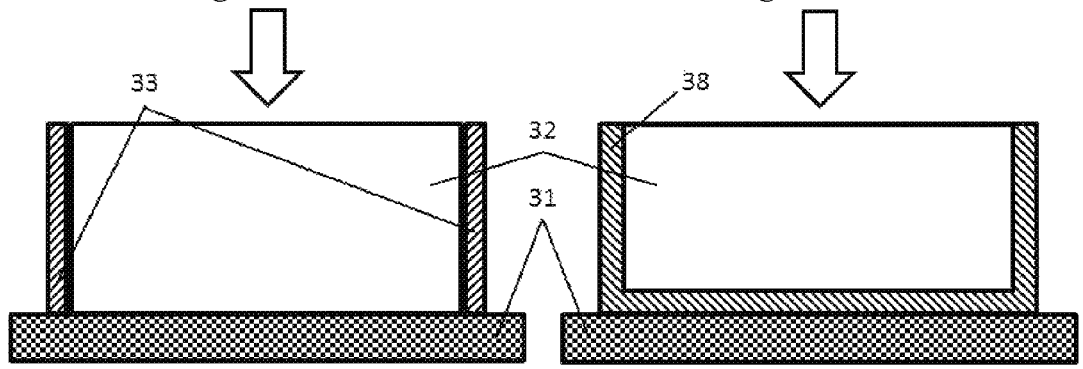
Figure 6C
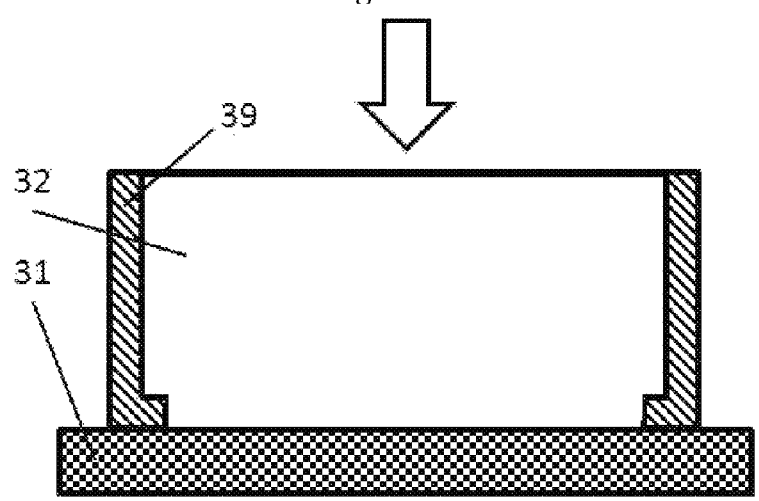
Figure 7A
Figure 7B
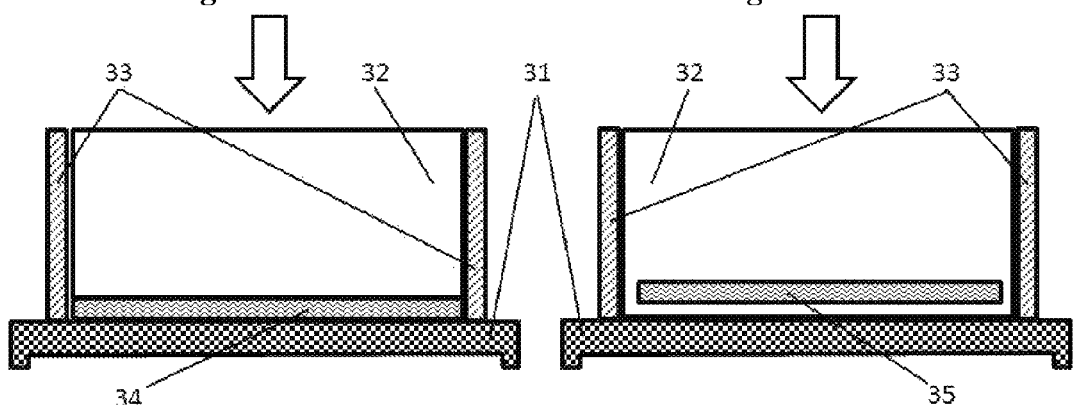

ADVANCED PHOTOLUMINESCENT COMPONENTS AND FORMULATION/FABRICATION METHODS FOR PRODUCTION THEREOF

CROSS REFERENCE TO RELATED APPLICATIONS

The present application is related to and claims priority under 35 U.S.C. 119(e) to U.S. Ser. No. 61/452,326 entitled "ADVANCED PHOTOLUMINESCENT COMPONENTS AND FORMULATION/FABRICATION METHODS FOR PRODUCTION THEREOF,"; filed Mar. 14, 2011. The entire contents of the above-identified patent application are incorporated herein by reference. The present application is related to the following co-owned applications: 1) U.S. Pat. No. 7,326,435, entitled "Low Light Level Illumination for Rotating Objects," issued on Feb. 5, 2008, 2) U.S. Pat. No. 7,676,981, entitled "Photoluminescent (PL) Weapon Sight Illuminator," issued on Mar. 16, 2010, and 3) U.S. Provisional Patent Application No. 61/256,891 entitled "PL for Illuminating Magnetic Compasses." These patents and patent application are hereby incorporated in their entirety by reference.

BACKGROUND OF THE INVENTION

1. Field of the Invention

The invention relates generally to the formulation and fabrication of components or elements using photoluminescent materials as the light source.

2. Discussion of Background

Present components or elements using photoluminescence for illumination commonly use either photoluminescent phosphors utilizing 1) zinc sulfide or 2) "alkali earth aluminate" referring to a compound containing aluminum, oxygen, and an alkaline earth metal (exemplary alkali earth aluminates include, for example, strontium aluminate [e.g., $SrAl_2O_4$]), or "alkali earth silicate" refers to a compound containing silicon, oxygen and an alkaline earth metal (exemplary alkali earth silicates include, for example strontium silicate) as the photoluminescent phosphor. These phosphors are most often dispersed in a polymer, encasing the photoluminescent phosphors and allowing the phosphors to be exposed to an activation source of light in the visible and ultraviolet spectra. For the purpose of elucidating certain aspects of the different embodiments, the term "alkaline earth metal" refers to an element from Group II of the periodic table. Exemplary alkaline earth metals include, amongst others, beryllium (Be), magnesium (Mg), calcium (Ca), strontium (Sr), barium (Ba) and radium (Ra).

Photoluminescent phosphors are commercially available in a wide range of average particle sizes including smaller than 5 microns, 5 microns to less than 20 microns, 20 microns to less than 50 microns, 50 microns to less than 90 microns, 90 microns to less than 250 microns, 250 microns to less than 1,000 microns, and 1,000 microns and greater. Present materials using photoluminescence for illumination often use photoluminescent phosphors that are not well size-optimized for the particular application for which they are being used nor are the polymers in which they are cast, necessarily optimized in their resin to catalyst mixing ratios to provide the best properties for mixing and casting.

While some specialized photoluminescent phosphors are coated to prevent absorption of luminance performance degrading moisture, most are not. Further, most present manufactured components or elements using photoluminescence for illumination are often hydrophilic, absorbing moisture over time that eventually causes the photoluminescent phosphors to deteriorate and reduce their ability to emit light.

SUMMARY OF THE INVENTION

According to one embodiment of the invention, there is provided a photoluminescent device including a polymer matrix having a light-emitting exterior surface for emission of photoluminescent light therefrom. The photoluminescent device has a plurality of UV or visible-light excited phosphor particles included in the polymer matrix. The phosphor particles in the polymer matrix have a concentration greater in an exterior region of the polymer matrix proximate the light-emitting exterior surface than in an interior region of the polymer matrix.

According to one embodiment of the invention, there is provided a photoluminescent device including a polymer matrix having a light-emitting exterior surface for emission of photoluminescent light therefrom. The photoluminescent device has a plurality of UV or visible-light excited phosphor particles included in the polymer matrix with the phosphor particles preferentially disposed toward the light-emitting exterior surface of the polymer matrix. The polymer matrix includes polymeric chain extenders and cross linkers in the polymer matrix forming a flexible phosphor composite of the polymer matrix and the particles.

According to one embodiment of the invention, there is provided a photoluminescent device including a polymer matrix having a light-emitting exterior surface for emission of photoluminescent light therefrom. The photoluminescent device has a plurality of UV or visible-light excited phosphor particles included in the polymer matrix with the phosphor particles preferentially disposed toward the light-emitting exterior surface of the polymer matrix. The polymer matrix and the phosphor particles form a flame-retardant phosphor composite.

According to one embodiment of the invention, there is provided a method for light illumination. The method exposes phosphor particles, preferentially disposed in a polymer matrix toward a light-emitting exterior surface of a polymer matrix containing the phosphor particles, to a UV or visible light source to charge the phosphor particles. The method emits from the polymer matrix photoluminescent light from the phosphor particles.

According to one embodiment of the invention, there is provided an exit sign which includes a front plate and a back plate interlocked together with at least one typographical character disposed on the front plate, the back plate or both plates. The typographical character is formed from the polymer matrix containing the phosphor particles.

It is to be understood that both the foregoing general description of the invention and the following detailed description are exemplary, but are not restrictive of the invention.

BRIEF DESCRIPTION OF THE FIGURES

The patent or application file contains at least one drawing executed in color. Copies of this patent or patent application publication with color drawing(s) will be provided by the Office upon request and payment of the necessary fee.

A more complete appreciation of the invention and many of the attendant advantages thereof will be readily obtained as the same becomes better understood by reference to the following detailed description when considered in connection with the accompanying drawings, wherein:

FIGS. 6A, 6B, and 6C are three depictions of abrupt-edged photoluminescent letters;

FIGS. 7A and 7B are schematic depictions of respective photoluminescent letters having a reflective backing material;

DETAILED DESCRIPTION OF THE INVENTION

Figure 1:
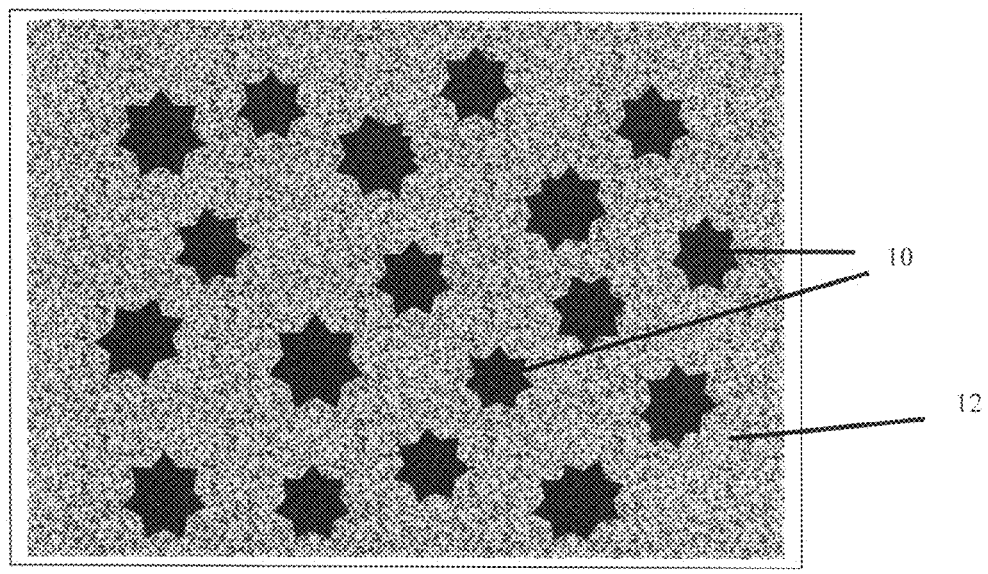
FIG. 1 is a drawing of an exemplary photoluminescent material showing a cross-section where nominally similar-sized photoluminescent phosphors are randomly dispersed in a polymer matrix.

In developing the invention, the inventors have found the following problems with conventional photoluminescent products and have developed solutions to these problems, as described below.

Presently manufactured components or elements using photoluminescence for illumination are often relatively rigid and can easily be cracked and broken. Even those that might otherwise perform acceptably in the absence of moisture, have their properties degraded in the presence of moisture. In the case of cast or extruded acrylic polymers, absorption of water is associated with a significant reduction in hardness and a "whitening" of the acrylic stemming from a disruption of the acrylic surface structure. See for example [J. Prosthodont. 2005 Dec. 14(4):233-8. *The effect of water absorption on acrylic surface properties*., by Devlin H, Kaushik P., Dept of Restorative Dentistry, Temple University School of Dentistry, Philadelphia, USA.

Presently manufactured components or elements using photoluminescence for illumination have photoluminescent phosphors distributed relatively evenly throughout the polymer in which the phosphors are dispersed, failing to take advantage of certain performance benefits that can be gained by non-homogenous dispersion, as discovered by the inventors.

Presently manufactured components or elements using photoluminescence for illumination often support combustion as indicated by tests such as horizontal flame spread, (e.g., ASTM E 162-2002, Standard Test Method for Surface Flammability of Materials Using a Radiant Heat Energy Source) rather than being self-extinguishing. Most often, when these non-self-extinguishing manufactured components or elements ignite, these components produce copious quantities of smoke and toxic gasses that hazard personnel and emergency responders in the area as well as adding to the fuel load in a conflagration.

Presently manufactured components or elements using photoluminescence for illumination most often emit light from all surfaces through which they absorb light for charging. In many cases, it would be beneficial to emit light only from preferentially desirable surfaces.

Presently manufactured components or elements using photoluminescence for illumination and polyurethane as the matrix most often use aromatic urethane containing an aromatic ring structure that is inherently not ultraviolet (UV) stable. While certain additives can be used to somewhat improve the material's UV resistance, these materials never achieve a high level of resistance to UV damage. Aliphatic urethane is a linear structure rather than a ring which is inherently better at resisting discoloration and damage from exposure to UV. The stability difference between the two types of urethanes is large. Aliphatic resins are excellent in stability during strong or long UV exposure, but are more expensive.

Presently manufactured components or elements using photoluminescence for illumination are often installed in locations where ambient light is insufficient to maintain a full charge of the photoluminescent phosphors. Incorporation of integral supplemental lighting (e.g., electroluminescent, light emitting diode (LED), are exemplary means) to maintain a full charge on the photoluminescent phosphors would be desirable.

The invention in various embodiments addresses these shortcomings.

Reference will now be made in detail to the present embodiments of the process, examples of which are illustrated in the accompanying drawings. Wherever possible, the same reference numbers will be used throughout the drawings to refer to the same or like features.

As used herein in this description, for the purpose of elucidating certain aspects of the different embodiments, the term "photoluminescent material" refers to any substance or material exhibiting photoluminescent characteristics used for the creation of manufactured components or elements. Examples of photoluminescent manufactured components or elements include objects incorporating photoluminescent materials in their physical composition.

As used herein in this description, for the purpose of elucidating certain aspects of the different embodiments, the term "cast mold" or "injection mold" refers to a method or item manufactured by placing a material into a mold and allowing the item to cure into a desired shape. Exemplary materials that may be placed in the mold include, for example, acrylics or urethanes, such as for example, an aliphatic urethane comprising a photoluminescent phosphor or phosphors.

FIG. 1 is a drawing of a typical photoluminescent material showing a cross-section where nominally similar-sized photoluminescent phosphors 10 are randomly dispersed in a polymer matrix 12. This distribution has several drawbacks including the disadvantage that photoluminescent phosphors deep in the bulk of the polymer matrix may not be well activated and visible light emitted from these deep phosphors may be scattered or absorbed before exiting the product.

Figure 2A:
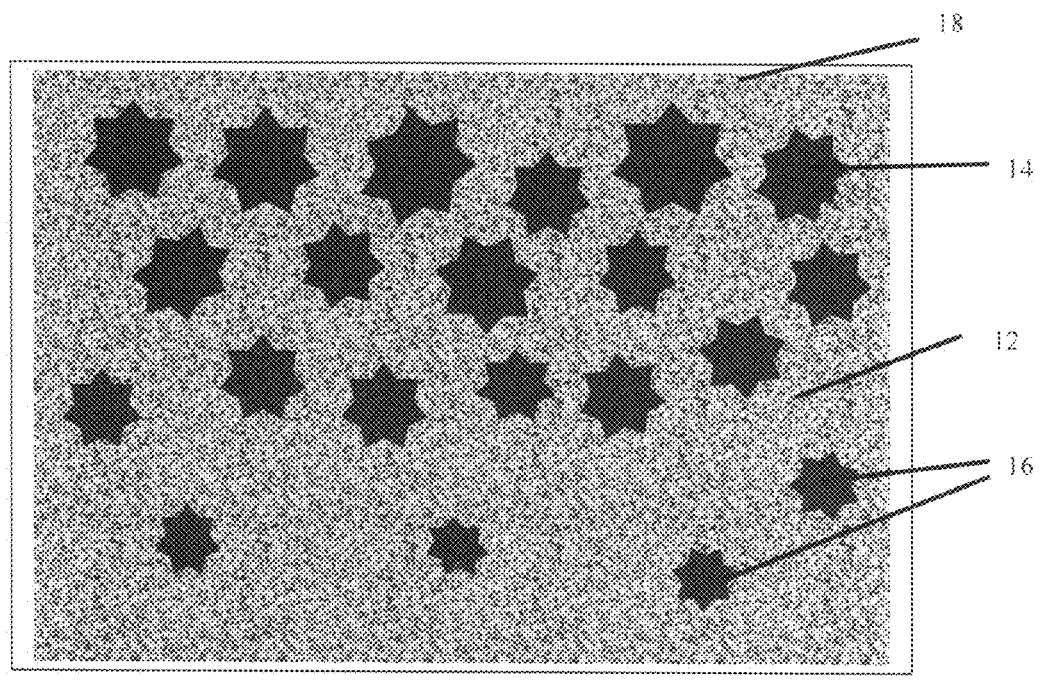
FIG. 2A is a drawing of an exemplary photoluminescent material showing a cross-section wherein larger- and smaller-sized photoluminescent phosphors are preferentially dispersed in a polymer matrix.

FIG. 2A is a drawing of a cross-section of an exemplary photoluminescent material according to one embodiment of the invention showing where different-sized photoluminescent phosphors 14 and 16 of the nominally similar-sized photoluminescent phosphors 10 are preferentially disposed in a polymer matrix 12 toward a light-emitting exterior surface 18 of the polymer matrix 12. Within the distributed range of phosphors sizes when purchased, phosphors have a distribution of a nominal size e.g., 20 microns. As these phosphors particles are mixed in and cast into a polymer, according to one embodiment of the invention, the larger particles in the range settle toward the bottom of the mold faster than the smaller sizes, leading to a particle size gradient in the material. According to one embodiment, as the polymer to catalyst mixing ratio is changed, the rate of polymerization and thus the viscosity and settling rate is adjusted, making the phosphor particle size gradient controllable.

Figure 2B:
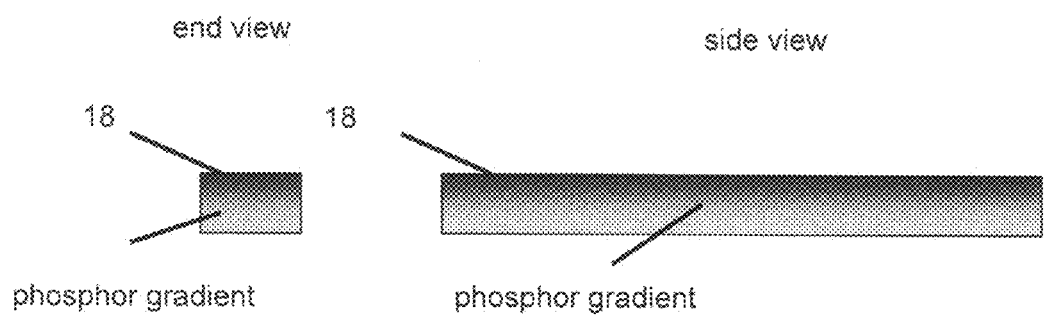
FIG. 2B is a drawing of an exemplary photoluminescent device according to one embodiment of the invention.

FIG. 2B is a drawing of an exemplary photoluminescent device according to one embodiment of the invention. As shown in FIG. 2B, the photoluminescent device includes a polymer matrix having a light-emitting exterior surface 18 for emission of photoluminescent light therefrom. The photoluminescent device has a plurality of phosphor particles included in the polymer matrix. The phosphor particles in the polymer matrix have a gradient in phosphor size in which the larger-sized phosphor particle concentration is greater in an exterior region of the polymer matrix than in an interior region of the polymer matrix. In this embodiment, the weight concentration of the phosphor particles in the exterior region can be 2-5 times, 5-50 times, or 50-100 times larger than in the interior region.

In one embodiment of the invention, the plurality of phosphor particles includes first and second phosphor particles. The first phosphor particles have a larger size than the second phosphor particles. The first phosphor particles in the exterior region have a greater size and thus weight concentration than the second phosphor particles in the exterior region. In this embodiment, the weight concentration of the first phosphor particles in the exterior region can be 2-5 times, 5-50 times, or 50-100 times larger than the second phosphor particles in the exterior region.

Figure 2C:
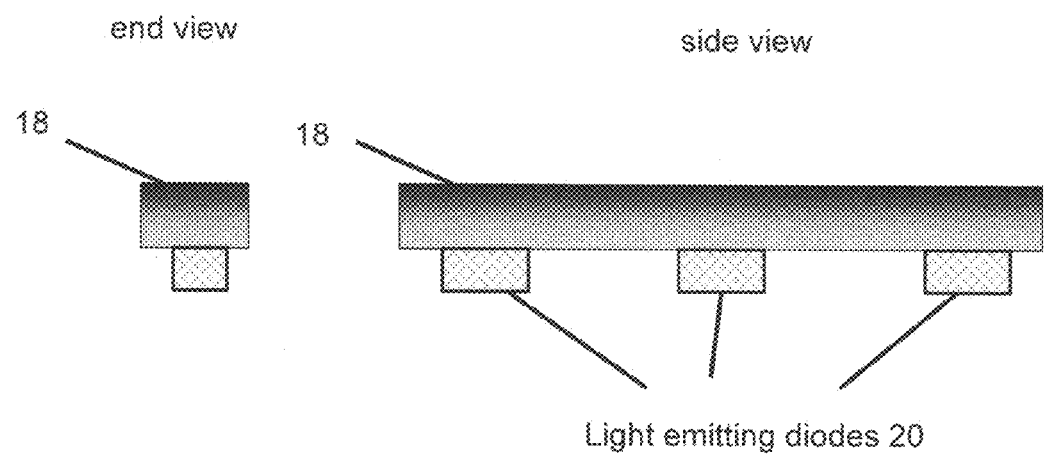
FIG. 2C is a drawing of an exemplary photoluminescent device according to one embodiment of the invention where an artificial point light source, or sources, is optically coupled to a polymer matrix containing a photoluminescent phosphor gradient.

FIG. 2C is a drawing of an exemplary photoluminescent device according to one embodiment of the invention where an artificial light source 20 (e.g., one or more light emitting diodes) is optically coupled to a polymer matrix containing a photoluminescent phosphor gradient. In this embodiment, light from the light source can be diffusively scattered by the phosphors to provide a substantially uniform illumination (and charging) in a lateral area of the phosphors near the light-emitting exterior surface 18. Photoluminescent light from the phosphors and light from the artificial source (when on) is emitted from the light-emitting exterior surface 18.

Figure 2D:
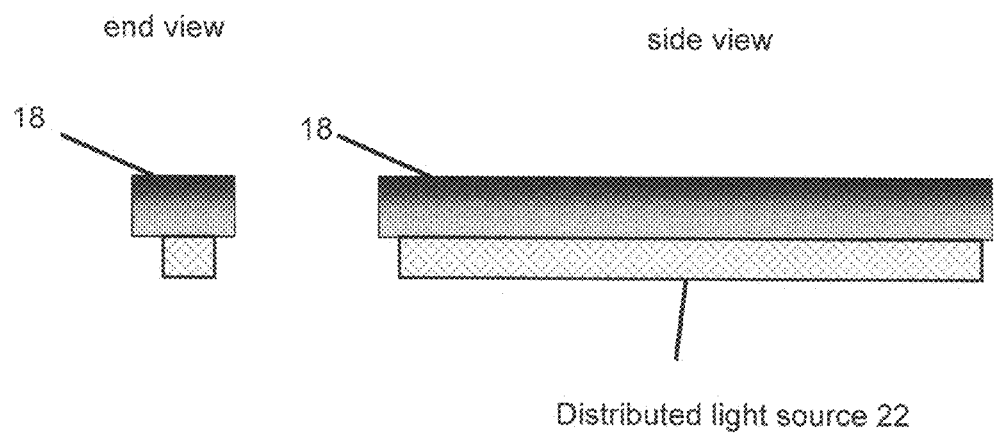
FIG. 2D is a drawing of an exemplary photoluminescent device according to one embodiment of the invention where an artificial distributed source is optically coupled to a polymer matrix containing a photoluminescent phosphor gradient.

FIG. 2D is a drawing of an exemplary photoluminescent device according to one embodiment of the invention where an artificial distributed light source 22 (e.g., such as an electroluminescent strip or panel) is optically coupled to a polymer matrix containing a photoluminescent phosphor gradient. In this embodiment, light from the distributed light source can be diffusively scattered by the phosphors to provide a substantially uniform illumination (and charging) of the phosphors near the light-emitting exterior surface 18. Photoluminescent light from the phosphors and light from the artificial source (when on) is emitted from the light-emitting exterior surface 18.

The basic principle behind photoluminescence is as follows and is provided to be illustrative and not limiting of the invention: electrons orbiting the photoluminescent material atoms or molecules absorb energy through interaction with photons during excitation. The principal excitation source is electromagnetic radiation (i.e., light in the visible and UV wavelengths, with the UV wavelengths being more likely to induce photoluminescence)—absorbed from visible and invisible light parts of the solar spectrum or other light sources. In some applications, it might be desirable to charge the photoluminescent material with a monochromatic light source (e.g., from a light emitting diode or a laser source). The photoluminescent materials can also be excited and induced to emit light as a result of certain types of vibration, heat and friction including for example exposing the photoluminescent materials to body heat and other low temperature sources (i.e., examples of other activation sources). When the excitation source is extinguished, photoluminescent materials release the stored energy in the form of visible light. It is the released or emitted light, commonly referred to as the afterglow, which is used in different embodiments of the invention as a self-luminous source. The afterglow decreases over time, typically (but not always) exhibiting a hyperbolic decay. The duration and the intensity of the afterglow is a function of several variables including: type of photoluminescent material; intensity of the activation source; type of activation source; and duration of activation exposure.

When photoluminescent phosphors are incorporated into polymeric manufactured components or elements, several factors affect the abilities of the photoluminescent phosphors to be activated (charged) and to emit an afterglow. As some of the photoluminescent phosphors lie very near the surface of the manufactured component or element, visible or ultraviolet light impinging upon the surface of the manufactured component or element may be transmitted directly to the surface of the photoluminescent phosphor and activate the electrons of its molecules or atoms. Light emitted by the photoluminescent phosphor is emitted randomly such that some portion of the light travels directly to the nearby surface of the manufactured component or element and some light is directed to the interior of the manufactured component or element where it may be absorbed in the polymer, reflected by a photoluminescent phosphor crystal, or absorbed by a photoluminescent phosphor crystal and re-emitted in a random direction. Thus, the morphology or structure of the manufactured component or element has bearing on how efficiently emitted light is directed to the surface of the manufactured component or element from which it is desired that the light be directed.

The preferred dispersion of phosphor particles is counter-intuitive in that location of larger-sized crystals near the surface of the manufactured components or elements might be expected to result in these larger phosphor crystals acting as shadow masks and limiting the underlying phosphors from charging and further limiting the emitted light from these underlying phosphors from reaching the exposed surface of the manufactured components or elements and thence being transmitted to the viewer. In fact, functionally, emission of light from more than about 2.5 mm below seldom reaches the surface of the manufactured components or elements to be emitted to the viewer and these large phosphors absorb, reflect and re-emit light energy in random directions. Testing has shown that these large phosphors when preferentially arrayed near the surface of the manufactured components or elements produce the brightest appearance.

Preferentially positioning the large phosphors near the light-emitting surface of the manufactured components or elements can best be accomplished by controlling the viscosity and pot life, or polymerization rate, of the polymer used to produce the manufactured components or elements and thus controlling the nature of the settling or sedimentation of the phosphor particles to achieve the preferred dispersion of the phosphor particles. This is done by controlling the phosphor particle size, phosphor loading, polymer selected and the resin to catalyst mixing ratio used.

In one embodiment of the invention, the photoluminescent material used for producing manufactured components or elements featuring illumination stemming from the emission of photons from photoluminescent phosphors include materials of an alkali earth aluminate or an alkali earth silicate. For example, in one embodiment of the invention, an alkali earth aluminate such as strontium aluminate (referred to hereinafter as "SrAl") is used as the phosphor. SrAl is a combination of Strontium, Aluminum, and Oxygen. For example, in another embodiment of the invention, the photoluminescent material includes $SrAl_2O_4$ photoluminescent material crystals. Further, in another embodiment of the invention, the $SrAl_2O_4$ crystals are doped with rare earth elements, such as, for example, lanthanides (e.g., Europium). Europium doped $SrAl_2O_4$ emits a green light with a wavelength of approximately 520 nm. In another embodiment of the invention, an alkali earth silicate such as strontium silicate (referred to hereinafter as "SrSi") that emits a blue light may be used. Similarly, in another embodiment of the invention, SrSi may be doped with rare earth elements, such as, for example, lanthanides (e.g., Europium). Exemplary sources of commercially available photoluminescent phosphors is United Mineral & Chemical Corp.(UMC), 1100 Valley Brook Avenue, Lyndhurst, N.J. 07071, telephone 800-777-0505, www.umc-corp.com and MH-W series photoluminescent pigment commercially available from Lanxi Minhui Photoluminescent Co., Ltd., 18, Yuezhong Street, Lanxi, Zhejiang Province, China, telephone 86-579-88948789, www.mphotoluminescent.com.

In many manufactured components or elements presently on the market, a reflective element is placed on a back surface of the manufactured component or element, opposite that from which it is desired that light be emitted. The reflective element redirects light to the front surface from which it is desired that light be emitted. In one embodiment of the invention, a reflective element on a back surface of the phosphor composite of the invention can be used to redirect light to the front surface. For example, a cast white acrylic layer can be used.

In various embodiments, the photoluminescent material may be charged by (1) ambient light, (2) if used as a secondary lighting source, by the primary lighting source, or (3) by any other source of natural or artificial lighting of the appropriate wavelength and intensity.

Photoluminescent materials have several advantages over other illumination sources such as tritium illuminators and light emitting diodes (LEDs). These advantages include: photoluminescent materials can be applied easily, they do not require an external power source (i.e., they are a passive system), photoluminescent materials are not hazardous (e.g., non-radioactive as is tritium), photoluminescent materials are not highly toxic as are LEDs due to the arsenic that LEDs contain, photoluminescent materials are a reusable technology and a sustainable technology, photoluminescent materials are durable and relatively maintenance-free.

As will be discussed in more detail below, the photoluminescent material in one embodiment of the invention is manufactured using a cast mold technique, such as, for example, by placing a urethane or acrylic including photoluminescent materials (e.g., strontium silicate or strontium aluminate particles) in a cast mold and allowing the material to cure or, alternatively, by using a poured casting technique. By using a cast mold technique, with or without agitation, polymer molding materials of differing viscosities can be accommodated, providing a wide range of preferential distribution of the phosphor sizes in the polymer. One advantage of casting is that it can accommodate varying material properties than when an injection molding process is used.

According to one process of the invention, the photoluminescent elements are poured and cast molded from a mixture of urethane and photoluminescent pigment. The strontium aluminate photoluminescent pigment makes up at least thirty-five percent (35%) of the mixture by weight. A mixture of between about forty-five percent and fifty-five percent (45-55%) of strontium aluminum oxide by weight can constitute a suitable photoluminescent material concentration from which to create the photoluminescent manufactured component or elements. A suitable stabilizer may be used from a known class of compounds such as benzophenones, benzotriazoles, or hindered amine light stabilizers (HALS) among others that are known to protect olefins and engineered polymers against damage from UV light or an aliphatic urethane polymer may be used. In one embodiment, a combination of these two approaches to UV resistance is used. The first approach is to use an aliphatic urethane resin which is naturally UV resistant. The second approach is to use an additive as described in an earlier paragraph. In other words, such a poured cast mold technique may be used to manufacture a photoluminescent device. For example, a poured cast mold technique, such as presently described, may be used to manufacture a shape with photoluminescent characteristics.

It should be noted that these cast mold or injection molded techniques for forming items with photoluminescent characteristics are but exemplary techniques, and other techniques and materials may be used without departing from this invention. Indeed, in one embodiment of the invention, spin casting techniques can also be used. In this embodiment, the preferential disposition of the larger particles occurs on the outside peripheral surfaces of the spin-cast article, as the centrifugal forces (like gravity in the cast molding) preferentially separates the larger size particles to the outside peripheral surfaces.

With either technique, a two-part urethane material can be combined in the manufacturer's recommended ratios using the manufacturer's recommended mixing procedures.

A polyurethane elastomer is comprised of two components: the prepolymer or resin (usually called the "A-side") and the catalyst or curative (usually called the "B-side").

The prepolymer includes isocyanate groups (NCO) that react with either hydroxyl (OH) groups or amine (NH2) groups in the curative. There are also typically other crosslinking reactions involved, but these are the major two. The name urethane comes from the reaction of the NCO and OH to form a urethane linkage. Since many of these linkages are formed, it is called a polyurethane. The reaction of the NCO and NH2 form a urea linkage and many react to form a polyurea.

Prepolymers. There are numerous prepolymers available, but only a handful of different types in terms of chemical backbone structure. There are two main ingredients controlling the type of prepolymer are the type of isocyanate and the polyol type. For urethane prepolymers, MDI and TDI are the two that are most common. There are some others that are used, such as PPDI, IPDI, and hydrogenated-MDI, but these are more costly and typically used when special properties are needed. The polyol will be usually one of four types: polyester, PTMEG polyether, PPG polyether, or polycaprolactone. Each has their strengths and weaknesses. Polyesters are known for superior physical properties, such as tensile and tear strength, and are also solvent resistant. However, they are not resistant to aqueous applications where there are acids or bases involved. The PTMEG polyethers are well known for their dynamic performance and good physical properties, but they also are more expensive. They do well in application involving water, as do PPG polyethers. The PPG ethers are a lower cost ether alternative having properties not as good as the PTMEGs typically. Polycaprolactone prepolymers are really just a type of polyester, with the benefit of lower viscosity, but cost is higher.

Curatives. As mentioned above, two principle reactions take place when the prepolymer and curative are mixed to form a solid. So, it makes sense that there are two basic types of curatives: amine functional and hydroxyl functional. The standard amine curative is a diamine called MBOCA. MBOCA is normally used with TDI prepolymers. The standard curative for MDI prepolymers is 1,4 butanediol, which is a hydroxyl functional curative. There are numerous other curatives available, and many can be mixed with others to make custom blends.

The main polyurethane (i.e., the aliphatic urethane) producing reaction is between an aliphatic diisocyanate and a polyol, typically a polypropylene glycol or polyester polyol, in the presence of catalysts. Urethane can be made in a variety of densities and hardnesses by varying the type of monomer(s) used and adding other substances to modify its characteristics, notably density, or enhance its performance. Other additives (as noted above) can be used to improve the fire performance, stability in difficult chemical environments, and other properties of the urethane products.

In one embodiment of the invention, polymeric chain extenders and/or cross linkers can be used to tailor the properties of the phosphor composite of the invention. Polymeric chain extenders and cross linkers are low molecular weight hydroxyl and amine terminated compounds that play an important role in the polymer morphology of polyurethane fibers, elastomers, adhesives, and certain integral skin and microcellular foams. The elastomeric properties of these materials are derived from the phase separation of the hard and soft copolymer segments of the polymer, such that the urethane hard segment domains serve as cross-links between the amorphous polyether (or polyester) soft segment domains. This phase separation occurs because the mainly non-polar, low melting soft segments are incompatible with the polar, high melting hard segments. The soft segments, which are formed from high molecular weight polyols, are mobile and are normally present in coiled formation, while the hard segments, which are formed from the isocyanate and chain extenders, are stiff and immobile. Because the hard segments are covalently coupled to the soft segments, they inhibit plastic flow of the polymer chains, thus creating elastomeric resiliency. Upon mechanical deformation, a portion of the soft segments are stressed by uncoiling, and the hard segments become aligned in the stress direction. This reorientation of the hard segments and consequent powerful hydrogen bonding contributes to high tensile strength, elongation, and tear resistance values [Oertel, Gunter (1985). *Polyurethane Handbook*. New York: Macmillen Publishing Co., Inc. ISBN 0-O$_2$-948920-2 Oertel, Gunter (1985). *Polyurethane Handbook*. New York: Macmillen Publishing Co., Inc. ISBN 0-02-948920-2] [Blackwell, J.; M. R. Nagarajan and T. B. Hoitink (1981). The Structure of the Hard Segments in MDI/diol/PTMA Polyurethane Elastomers. Washington, D.C.: American Chemical Society. ISSN 0097-6156/81/ 0172-0179] [Blackwell, John; Kenncorwin H. Gardner (1979). Structure of the hard segments in polyurethane elastomers. IPC Business Press. ISSN 0032-3861/79/010013-05] [Grillo, D. J.; Housel, T. L. (1992). "Physical Properties of Polyurethanes from Polyesters and Other Polyols". Polyurethanes '92 Conference Proceedings. New Orleans, La.: The Society of the Plastics Industry, Inc.] [Musselman, S. G.; Santosusso, T. M. and Sperling, L. H. (1998). "Structure Versus Performance Properties of Cast Elastomers". *Polyurethanes '98 Conference Proceedings*. Dallas, Tex.: The Society of the Plastics Industry, Inc.]. The choice of chain extender also determines flexural, heat, and chemical resistance properties. The most important chain extenders are ethylene glycol, 1,4-butanediol (1,4-BDO or BDO), 1,6-hexanediol, cyclohexane dimethanol and hydroquinone bis(2-hydroxyethyl) ether (HQEE). All of these glycols form polyurethanes that phase separate well and form well-defined hard segment domains.

In one illustrative method of the invention, a specified quantity of photoluminescent phosphor crystals (e.g., SrAl particles) with specified average or nominal size (and size variation) is added and mixed into the mixed polymer components, according to the ranges described above and below.

After a specified amount of time (e.g., 2 minutes), the polymer and photoluminescent phosphor mixture are poured into a mold where the mixture is allowed to cure. In such an example, the resulting poured cast item will accordingly have photoluminescent characteristics.

In another embodiment of this casting process, the mold is placed under a vacuum to allow any entrained gases to be removed.

In one embodiment of the invention, the photoluminescent materials, such as for example, alkaline earth aluminate photoluminescent materials, zinc sulfides, such as ZnS:Cu, silicate aluminates, strontium aluminate (SrAlO$_3$:Eu), or combinations thereof are included in a luminescent pigment (containing the photoluminescent materials of the invention) for creating poured cast molded manufactured components or elements or article therefrom. Moreover, the luminescent materials of U.S. Pat. No. 5,853,614 can also be used such as for example:

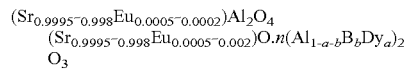

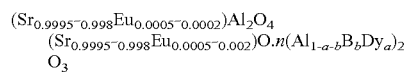

where a=0.0005–~0.002, b=0.001–~0.35, n=1–~8.

Figure 3:
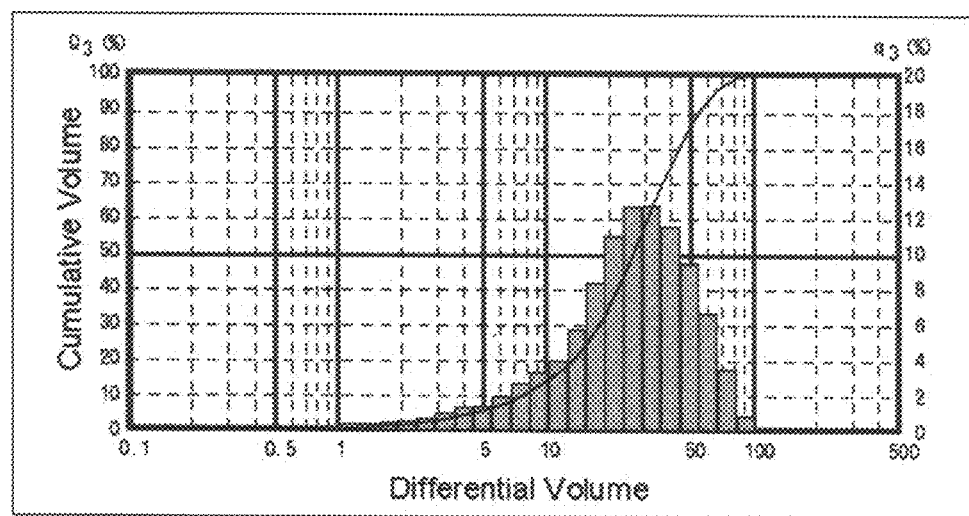
FIG. 3 is a graph that depicts a typical particle size distribution for nominally 30 micron photoluminescent phosphor particles [courtesy of LumiNova G-300 Catalog from Nemoto & Co., Ltd. http://www.nemoto.co.jp/en/products/luminova/list.html]

Various particle sizes, mesh sizes and grades of the pigments may be used depending on the desired effect. FIG. 3 is graph that depicts a typical particle size distribution for nominally 30 micron photoluminescent phosphor particles [Lumi-Nova G-300 Catalog from Nemoto & Co., Ltd. http://www.nemoto.co.jp/en/products/luminova/list.html]. FIG. 3 shows the distribution of particle sizes for a nominal particle size, e.g. 30 microns. The D50 diameter (the mean particle size) was 30 microns. This graph depicts the size variations to be expected.

Phosphor particle sizes ranging from 2 microns to 1,000 microns, for example, can be employed in the invention. Particles are typically classified as 4 microns and smaller, 5 microns to less than 20 microns, 20 microns to less than 50 microns, 50 microns to less than 90 microns, 90 microns to less than 250 microns, 250 microns to less than 1,000 microns, and 1,000 microns and greater. Particle sizes of about 2 microns to 10 microns are suitable for printing inks. Particle sized of about 10 microns to 40 microns are generally suitable for spray painting and plastic molding. Particle sizes of about 45 microns to 65 microns are generally suitable for brush painting and dipping. Particle sizes of about 20 microns to 1,000 microns are suitable for poured cast molding.

Generally, the larger the particle size, typically the higher the intensity of luminescence. Afterglow time and intensity are generally dependent on type of pigment, particle size and grade. Alkaline earth aluminate photoluminescent materials and alkaline earth silicate aluminates have longer afterglow times than ZnS:Cu, for example. The pigment may be added to the media in an amount effective to produce a luminescent effect. In one embodiment, color dyes are added to the pigments to achieve various luminescent colors. The addition of color dyes can reduce the overall luminosity; however, the addition may produce a color emission for which the human eye is more responsive. In one embodiment, different phosphors with different characteristic colors are included in the photoluminescent article to achieve various luminescent colors. For example, while strontium aluminate provides a characteristic green luminescent color, strontium silicate provides a characteristic blue luminescent color.

Figure 4:
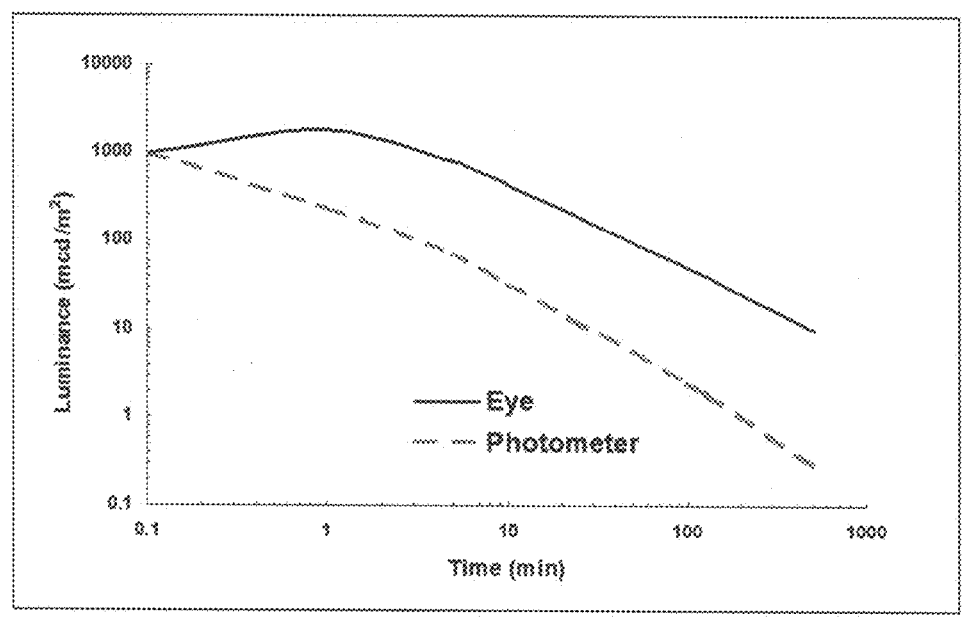
FIG. 4 is a graph that depicts luminance as a function of time for one photoluminescent material of the invention.

FIG. 4 shows a typical decay curve for the photoluminescent material and illustrates the differences of "perceived" brightness by the human eye from what a light meter may actually measure. Typical, well-designed SrAl materials can be fully charged from exposure to approximately 3-4 minutes of a typical UV lamp (blacklight) or may be fully charged by approximately 7-8 minutes exposure to bright sunlight. Alternately, it may be fully charged by approximately 21-23 minutes exposure in a room brightly illuminated by fluorescent lighting or following approximately 24-26 minutes exposure in a room brightly illuminated by incandescent lighting.

After being fully charged (for example by exposure to an unfiltered continuous short arc xenon source of light of 500 W or less for 5 min, providing an illumination of 1,000 lux (93 fc) on the marking surface), the SrAl material's curve is above the minimum luminance level for human visibility (0.05 millicandela per square meter ($mcd/m^2$))

In general, the invention provides methods or processes for formulating and fabricating photoluminescent manufactured components and provides photoluminescent products made from these processes. In one embodiment, the particle type and particle size are configured to define the photoluminescence externally observed. In one embodiment, the polymer matrix into which the photoluminescent phosphor is dispersed is a polymer which is flame and combustion resistant. In one embodiment, the degree and nature of that dispersion is controlled 1) to improve the external photoluminescence, 2) improve the flexibility of the polymer matrix, 3) to resist water absorption, and/or 4) to resist degradation from ultraviolet light and flame spread.

According to a first embodiment of the invention, there is provided a process or method for preferentially dispersing at least two different-sized photoluminescent phosphors in a polymer matrix to form a composite such that the larger phosphors are distributed more preferentially at the surface of the composite.

According to a second embodiment of the invention, the polymer matrix includes an aromatic urethane polymer with an additive for enhancing the polymer's resistance to damage from exposure to ultraviolet (UV) light.

According to a third embodiment of the invention, the polymer matrix includes an aliphatic urethane polymer.

According to a fourth embodiment of the invention, the photoluminescent phosphors include an alkali earth aluminate such as strontium aluminate (referred to hereinafter as "SrAl") may be used. SrAl is a combination of strontium, aluminum, and oxygen such as $SrAl_2O_4$ photoluminescent material crystals doped with rare earth elements, such as, for example, lanthanides (e.g., Europium).

According to a fifth embodiment of the invention, the photoluminescent phosphors include an alkali earth aluminate including in one example an alkali earth silicate such as strontium silicate (referred to hereinafter as "SrSi") that emits a blue light.

According to a sixth embodiment of the invention, the aforementioned photoluminescent phosphors include at least two different-sized phosphors preferentially-dispersed in an aliphatic urethane polymer matrix to form a composite such that the larger phosphors are distributed more preferentially at the surface of the composite. This composite can be poured cast molded or formed by other means.

According to a seventh embodiment of the invention, the aforementioned photoluminescent phosphors include at least two different-sized phosphors, the phosphors having a nominal particle size in a range from 5 microns (for the smaller of the phosphors) to less than 20 microns (for the larger of the phosphors), with the phosphors preferentially-dispersed to form a composite such that the larger phosphors are distributed more preferentially at the surface of the composite. With standard sorting and grading techniques, for a selected nominal size of for example 5 microns, the variation in size would be expected to be +/−10%. With standard sorting and grading techniques, for a selected nominal size of for example 20 microns, the variation in size would be expected to be +/−10%. The invention is not limited to having this variation, and other variations are also suitable.

According to an eighth embodiment of the invention, the aforementioned photoluminescent phosphors include at least two different-sized phosphors, the phosphors having a nominal particle size in a range from 20 microns (for the smaller of the phosphors) to less than 50 microns (for the larger of the phosphors), with the phosphors preferentially-dispersed to form a composite such that the larger phosphors are distributed more preferentially at the surface of the composite. With standard sorting and grading techniques, for a selected nominal size of for example 20 microns, the variation in size would be expected to be +/−10%. With standard sorting and grading techniques, for a selected nominal size of for example 50 microns, the variation in size would be expected to be +/−10%. The invention is not limited to having this variation, and other variations are also suitable.

According to a ninth embodiment of the invention, the aforementioned photoluminescent phosphors include at least two different-sized phosphors, the phosphors having a nominal particle size in a range from 50 microns (for the smaller of the phosphors) to less than 90 microns (for the larger of the phosphors), with the phosphors preferentially-dispersed to form a composite such that the larger phosphors are distributed more preferentially at the surface of the composite. With standard sorting and grading techniques, for a selected nominal size of for example 50 microns, the variation in size would be expected to be +/−10%. With standard sorting and grading techniques, for a selected nominal size of for example 90 microns, the variation in size would be expected to be +/−10%. The invention is not limited to having this variation, and other variations are also suitable.

According to a tenth embodiment of the invention, the aforementioned photoluminescent phosphors include at least two different-sized phosphors, the phosphors having a nominal particle size in a range from 90 microns (for the smaller of the phosphors) to less than 250 microns (for the larger of the phosphors), with the phosphors preferentially-dispersed to form a composite such that the larger phosphors are distributed more preferentially at the surface of the composite. With standard sorting and grading techniques, for a selected nominal size of for example 90 microns, the variation in size would be expected to be +/−10%. With standard sorting and grading techniques, for a selected nominal size of for example 250 microns, the variation in size would be expected to be +/−10%. The invention is not limited to having this variation, and other variations are also suitable.

According to an eleventh embodiment of the invention, the aforementioned photoluminescent phosphors include at least two different-sized phosphors, the phosphors having a nominal particle size in a range from 250 microns (for the smaller of the phosphors) to less than 1000 microns (for the larger of the phosphors), with the phosphors preferentially-dispersed to form a composite such that the larger phosphors are distributed more preferentially at the surface of the composite. With standard sorting and grading techniques, for a selected nominal size of for example 250 microns, the variation in size would be expected to be +/−10%. With standard sorting and grading techniques, for a selected nominal size of for example 1000 microns, the variation in size would be expected to be +/−10%. The invention is not limited to having this variation, and other variations are also suitable.

According to a twelfth embodiment of the invention, the aforementioned photoluminescent phosphors include at least two different-sized phosphors, the phosphors having a nominal particle size of 1000 microns form a composite such that the larger phosphors in the nominally sized 1000 micron lot are more preferentially at the surface of the composite. With standard sorting and grading techniques, for a selected nominal size of for example 1000 microns, the variation in size would be expected to be +/−10%. The invention is not limited to having this variation, and other variations are also suitable.

According to a thirteenth embodiment of the invention, two or more differently sized grades of photoluminescent phosphors are preferentially-dispersed, in a polymer matrix. This composite can be poured cast molded or formed by other means. For example, a lot having a nominal particle size in a range from 250 microns to less than 1000 microns could be mixed with a lot having a nominal particle size in a range from 50 microns to less than 90 microns. Indeed, the invention accommodates mixing of the differently sized grades of phosphor particles described above.

According to a fourteenth embodiment of the invention, the photoluminescent phosphors are coated to minimize the effects of the polymeric matrix absorbing moisture. Exemplary coatings include glasses such as silicon dioxide ($SiO_2$) or maleic anhydride ($C_2H_2(CO)_2O$). Alternatively, moisture resistance can be enhanced by direct surface reaction with phosphoric acid ($H_3PO_4$) to produce amorphous layers in nanoscale and crystalline layers in microscale. Exemplary commercially available, coated crystals include: LumiNova G-300M PS-2 commercially available from United Mineral & Chemical Corp.(UMC), 1100 Valley Brook Avenue, Lyndhurst, N.J. 07071, telephone 800-777-0505, www.umc-corp.com and MH-W series photoluminescent pigment commercially available from Lanxi Minhui Photoluminescent Co., Ltd., 18, Yuezhong Street, Lanxi, Zhejiang Province, China, telephone 86-579-88948789, www.mphotoluminescent.com.

According to a fifteenth embodiment of the invention, the polymer matrix containing preferentially-dispersed, photoluminescent phosphors incorporates chain extenders and cross-linkers to make the phosphor composite flexible and to cause the phosphor composite to have increased resistance to impact. Chain extenders for aliphatic urethanes are well known to those in the art of polymer chemistry. Exemplary chain extenders are described in U.S. Pat. Nos. 5,096,993 and 5,185,420 both to Smith et al., where chain extenders selected from the group of diols, diamines, and combinations thereof. Accordingly, suitable chain extenders for this invention include one or more of ethylene glycol, diethylene glycol, propylene glycol, dipropylene glycol, butane diol, pentane diol, 3-methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100-500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof. Moreover, suitable chain extenders for this invention can additionally contain anti-oxidants, plasticizers, UV stabilizers, adhesion promoters, fillers and/or pigments. These chain extenders and additives can be employed in an amount of between 0 and about 75 weight percent based upon the total weight of the composition. Moreover, suitable chain extenders for this invention can include one or more of ethylene glycol, diethylene glycol, propylene glycol, dipropylene glycol, butane diol, pentane diol, methylpentane-1,5-diol, hexane diol, oxyalkylated hydroquinone, resorcinol and bisphenol A, hydrogenated bisphenol A, 1,4-cyclohexane dimethanol, polyalkylene oxide diols with molecular weights between 100-500, diethyltoluene diamine, ethylene diamine, 4,4'-methylene bis(2-chloroaniline) ("MOCA"), hydrazine, substituted aromatic diamines, N,N-bis(2-hydroxypropyl)-aniline, and combinations thereof, or other known chain extenders.

The cross linking agent can be any of those known to those experienced in the art. The cross linking agents can be organic or inorganic agents. A combination of cross linking agents can be used. Exemplary cross linking agents include: epoxy compounds, polyfunctional aziridines, methoxyalkyl melamines, triazines, polyisocyanates, carbodiimides, polyvalent metal cations, and others known to those experienced in the art. Exemplary commercially available cross linking agents include: 1) those supplied by Zeneca Resins under the tradename NeoCryl® CX 100; 2) the cross linking agent supplied by EIT Industries under the tradename XAMA®-7; and, 3) the polyfunctional carbodimide cross linking agent supplied by Union Carbide under the tradename Ucarlink XL-29SE, as well as others known to those experienced in the art of polymer chemistry. Other crosslinking agents include the organometallic catalysts containing metals of group III-A, IV-A, V-A, VI-A, VIII-A, I-B, II-B, IV-B and V-B. Particularly useful cross linking agents are tin dioctoate, tin naphthenate, dibutyltin dilaurate, dibutyltin diacetate, dibutyltin dioxide, dibutyl tin dioctoate, zirconium chelates, aluminum chelates, aluminum titanates, titanium isopropoxide, triethylene diamine, p-toluene sulfonic acid, n-butyl phosphoric acid, and mixtures thereof.

Alternatively, in one embodiment of the invention, one may use an aliphatic urethane system pre-formulated to include such chain extenders and crosslinking agents. Exemplary pre-formulated urethane systems with chain extenders and crosslinkers are: 1) Flex 70 and Flex 80 are exemplary aliphatic urethane systems commercially available from Alumilite Corporation, Alumilite Corporation, 315 E. North St., Kalamazoo, Mich. 49007, telephone 800-447-9344, www.alumilite.com; 2) F-70 and F-80 are exemplary aliphatic urethane systems commercially available from BJB Enterprises, 14791 Franklin Avenue, Tustin, Calif. 92780, telephone 714-734-8450, www.bjbindustries.com; and, 3) Smooth-Cast® 65D urethane systems commercially available from Smooth-On, Inc., 2000 Saint John Street, Easton, Pa. 18042, telephone 800-762-0744, www.smooth-on.com; and, 3) other commercially available urethane systems know to those skilled in the art of polymer chemistry.

According to a sixteenth embodiment of the invention, the preferentially-dispersed, photoluminescent phosphors are nominally the same size or differently-sized, and the polymer material is an aliphatic urethane incorporating additives to make a composite thereof more resistant to extended exposure strong ultraviolet light. Exemplary UV stabilizer additives suitable for the invention include: 1) 2-(2-hydroxy-5-methylphenyl)benzotriazole; 2) 2-(2h-benzotriazol-2-yl)-4,6-di-tert-pentylphenol; 3) 2-(3-sec-butyl-5'-tert-2-hydroxyphenyl)-2H-benzotriazole; 4) Mix.a-[3-[3-(2H-Benzotriazol-2-yl)-5-(1,1-dimethylethyl)-4-hydroxyphenyl]-1-oxopropyl]-w-hydroxypoly(oxo-1,2-ethanediyl); a-[3-[3(2H-Benzotriazol-2-yl)-5-(1,dimethylethyl)-4-hydroxyphenyl]-1-oxopropyl]-w-[3-[3-(2H-benzotriazol-2-yl)-5-(1,1-dimethylethyl)-4-hydroxyphenyl]-1-oxopropoxy]poly(oxy-1,2-ethanediyl); PEG300; or 5) other UV stabilizers known to those skilled in the art of polymer chemistry. Urethane system suppliers often offer UV stabilizers tailored for their specific products. Such an example is Sun Devil®-UV Resistant Additive commercially available from Smooth-On, Inc., 2000 Saint John Street, Easton, Pa. 18042, telephone 800-762-0744, www.smooth-on.com.

According to a seventeenth embodiment of the invention, the preferentially-dispersed, photoluminescent phosphors are nominally the same size or differently-sized, and the polymer material is an aliphatic urethane incorporating additives to make it more resistant to water absorption. Exemplary moisture-blocking coating materials suitable for the invention include: 1) glassy materials such as silicon di-oxide; 2) maleic anhydride; or 3) other non-moisture-permeable coatings known to those skilled in the arts of manufacturing and luminescence of $SrA_2O_4:Eu^{2+} Dy^{3+}$ (SAO-ED) phosphors. Alternatively, moisture tolerant photoluminescent phosphors such as LumiNova® G-300M PS-2 are commercially available from United Mineral & Chemical Corp.(UMC), 1100 Valley Brook Avenue, Lyndhurst, N.J. 07071, telephone 800-777-0505, www.umccorp.com and MH-W series photoluminescent pigment commercially available from Lanxi Minhui Photoluminescent Co., Ltd., 18, Yuezhong Street, Lanxi, Zhejiang Province, China, telephone 86-579-88948789, www.m-photoluminescent.com.

According to an eighteenth embodiment of the invention, the preferentially-dispersed, photoluminescent phosphors are nominally the same size or differently-sized, and the polymer material is an aliphatic urethane mixed in a ratio other than that recommended by the urethane formulator in order to control cure times, and manipulate the settling of the photoluminescent phosphors during the polymer mixing, casting and curing. The preferred ratio is nominally 100 parts of Side A to 90 parts of Side B depending on the exact source and type of resin used.

In one aspect of this embodiment of the invention, nominal particle sizes of either 90, 250 or 1,000 microns are used for respective castings. The 1,000 micron size phosphors are the brightest phosphors but typically incur more cost as a raw material.

In one aspect of this embodiment of the invention, the mixing ratio used is ten (10) parts resin to nine (9) parts catalyst, providing about a 10-12 minute pot life, sufficient to prevent too much settling of the large particles while slow enough to avoid having the material harden before the composite mixture can be thoroughly mixed and poured into the mold.

According to a nineteenth embodiment of the invention, the preferentially-dispersed, photoluminescent phosphors are nominally the same size or differently-sized, and the polymer material is an aliphatic urethane with additives to make it self-extinguishing when a flame sources is removed. Exemplary additives include: 1) aluminum trihydrate and 2) others known to those skilled in the art of polymer chemistry.

According to an twentieth embodiment of the invention, the preferentially-dispersed, photoluminescent phosphors are nominally the same size or differently-sized, and the polymer material is an aliphatic urethane with an optical coating (e.g., a notch or edge filter) applied to the external surfaces of the manufactured components or elements to allow ultraviolet light to pass into the manufactured components or elements (for the purpose of activating, exciting or charging the photoluminescent phosphors) but blocking, attenuating or otherwise restricting visible light from being emitted through those surfaces other than the surface it is desired that light be emitted from.

In one embodiment of the invention, the optical filter is a notch or edge filter made of a thin film constituting a layer of material ranging from fractions of a nanometer (monolayer) to several micrometers in thickness. Electronic semiconductor devices and optical coatings have typically used notch or edge filters. In those areas and in this invention, thin-film, vacuum-deposition optical coatings can be used to deposit notch or edge filters on the phosphor composite of this invention, which will allow ultraviolet light to reach the entire surface of the manufactured component or element containing the photoluminescent phosphors but only allow visible light to be emitted from the manufactured component or element from areas not covered by the thin film optical filter.

The performance of optical coatings (e.g. antireflective coatings) is typically enhanced when the thin film coating includes multiple layers having varying thicknesses and refractive indices. In one embodiment of this invention, dielectric optical coatings (i.e. using materials with a different refractive index to the composite) are constructed from thin layers of materials such as magnesium fluoride, calcium fluoride, and various metal oxides, which can be deposited onto the phosphor composite of this invention. By choice of the exact composition, thickness, and number of these layers, it is possible to tailor the reflectivity and transmissivity of the coating to produce almost any desired characteristic.

Thin-film optics is the branch of optics that deals with very thin structured layers of different materials. In order to exhibit thin-film optics, the thickness of the layers of material should be on the order of the wavelengths of visible light (about 500 nm). Layers at this scale can have remarkable reflective properties due to light wave interference and the difference in refractive index between the layers, the air, and the substrate. These effects alter the way the optic reflects and transmits light. Thin film layers can be achieved through the deposition of one or more thin layers of material onto a substrate. This can be done in this invention for example by 1) dipping the photoluminescent item to be coated into a liquid solution for a thicker coating, or 2) by using a physical vapor deposition process, such as sputter deposition or a chemical vapor deposition process to deposit the thin film notch or edge filters on the phosphor composite of the invention.

Optical filters, generally, belong to one of two categories. The simplest, physically, is the absorptive filter, while the latter category, that of interference or dichroic filters, can be quite complex. Optical filters selectively transmits light having certain properties (often, a particular range of wavelengths, that is, range of colors of light), while blocking the remainder. Exemplary thin-film optical coatings useful for coating the phosphor composites of this invention include those commercially provided by companies such as Evaporated Coatings, Incorporated, 2365 Maryland Road, Willow Grove, Pa. 19090, telephone: 215-659-3080, www.evaporatedcoatings.com.

According to a twenty-first embodiment of the invention, the preferentially-dispersed, photoluminescent phosphors are nominally the same size or differently-sized, and the polymer material is an aliphatic urethane manufactured component or element with an illumination source (e.g., electroluminescent, LED, or other) affixed to, printed upon, or embedded within to provide a light source for ensuring that the photoluminescent phosphors are fully-charged under normal circumstances when the illumination source is operating.

An exemplary illumination source would be an integral electroluminescent lamp including an overlay, a front transparent electrode, a rear electrode, a dielectric material, and a phosphor layer having an electroluminescent phosphor, the overlay having a long-afterglow phosphor and being positioned adjacent to the front transparent electrode.

According to a twenty-second embodiment of the invention, the phosphor composite is a flame-retardant phosphor composite that self-extinguishes when an ignition source is removed as indicated by tests for horizontal flame spread. (e.g., ASTM E 162-2002, Standard Test Method for Surface Flammability of Materials Using a Radiant Heat Energy Source).

According to a twenty-third embodiment of the invention, a method for light illumination of the invention includes 1) exposing phosphor particles, preferentially disposed in a polymer matrix toward a light-emitting exterior surface of a polymer matrix containing the phosphor particles, to a UV or visible light source to charge the phosphor particles and 2) emitting from the polymer matrix photoluminescent light from the phosphor particles.

In this embodiment, the phosphor particles can be exposed to at least one of sunlight, an artificial light source, a fluorescent light source, an ultraviolet light source, a visible light source, and a light emitting diode light source. In this embodiment, the phosphor particles can be exposed to an artificial light source integrated with or optically coupled to the polymer matrix. In this embodiment, the phosphor particles can emit photoluminescent light when the artificial light source is on or off.

In this embodiment, the phosphor particles emit photoluminescent light from at least one of an exit sign, an egress marking, a navigational marker, a travel or path trail indicator, vehicle fenders, and wheel chocks.

EXAMPLES

Working Example

250 Micron Photoluminescent Phosphor

For a 1"×20" by 0.625" cast bar made from AG-UPL-250
Ingredients
50 grams of F-70, flexible, 70 Shore A, urethane elastomer, Side A (resin) from BJB Enterprises, 14791 Franklin Avenue, Tustin, Calif. 92780, telephone 714-734-8450, www.bjbindustries.com
45 grams of F-70, flexible, 70 Shore A, urethane elastomer, Side B (catalyst) from BJB Enterprises, 14791 Franklin Avenue, Tustin, Calif. 92780, telephone 714-734-8450, www.bjbindustries.com
84 grams nominal 250 micron photoluminescent pigment from United Mineral & Chemical Corp. (UMC), 1100 Valley Brook Avenue, Lyndhurst, N.J. 07071, telephone 800-777-0505, www.umccorp.com
Method
Heat mold to 200 degrees for 10 minutes
Combine Side A (resin) and pigment in a smooth-sided mixing cup
Mix thoroughly with a spatula, scraping the sides and bottom to get thorough mixing
Add Side B (catalyst). Working time will be about 10 to 12 minutes. Note the working time would be only 4 minutes if a 1:1 ratio of resin to catalyst mixture was used
Mix thoroughly with a spatula, scraping the sides and bottom to get thorough mixing
Vacuum de-gas until bubbles cease rising to surface
Spray mold with Stoner silicone spray urethane mold release agent (widely available commercially) coating all surfaces
Level mold
Pour degassed liquid into a mold
Level liquid and allow pigment to settle
Allow to cure at room temperature for 3-4 hours minimum Illustrative Teaching Example 1

1000 micron photoluminescent phosphor

For a 1"×20" by 0.625" cast bar made from AG-UPL-1000
Ingredients
50 grams of F-70, flexible, 70 Shore A, urethane elastomer, Side A (resin) from BJB Enterprises, 14791 Franklin Avenue, Tustin, Calif. 92780, telephone 714-734-8450, www.bjbindustries.com
45 grams of F-70, flexible, 70 Shore A, urethane elastomer, Side B (catalyst) from BJB Enterprises, 14791 Franklin Avenue, Tustin, Calif. 92780, telephone 714-734-8450, www.bjbindustries.com
84 grams nominal 1000 micron photoluminescent pigment from United Mineral & Chemical Corp. (UMC), 1100 Valley Brook Avenue, Lyndhurst, N.J. 07071, telephone 800-777-0505, www.umccorp.com
Method
Heat mold to 200 degrees for 10 minutes
Combine Side A (prepolymer or resin) and pigment in a smooth-sided mixing cup
Mix thoroughly with a spatula, scraping the sides and bottom to get thorough mixing Add Side B (curative or catalyst). Working time will be about 10 to 12 minutes. Note the working time would be only 4 minutes if a 1:1 ratio of resin to catalyst mixture was used Mix thoroughly with a spatula, scraping the sides and bottom to get thorough mixing Vacuum de-gas until bubbles cease rising to surface Spray mold with Stoner silicone spray urethane mold release agent coating all surfaces Level mold Pour degassed liquid into a mold Level liquid and allow pigment to settle Allow to cure at room temperature for 3-4 hours minimum Illustrative Teaching Example 2

90 Micron Photoluminescent Phosphor

For a 1"×20" by 0.625" cast bar made from AG-UPL-90

Ingredients 50 grams of F-70, flexible, 70 Shore A, urethane elastomer, Side A (resin) from BJB Enterprises, 14791 Franklin Avenue, Tustin, Calif. 92780, telephone 714-734-8450, www.bjbindustries.com 45 grams of F-70, flexible, 70 Shore A, urethane elastomer, Side B (catalyst) from BJB Enterprises, 14791 Franklin Avenue, Tustin, Calif. 92780, telephone 714-734-8450, www.bjbindustries.com 84 grams nominal 90 micron photoluminescent pigment from United Mineral & Chemical Corp. (UMC), 1100 Valley Brook Avenue, Lyndhurst, N.J. 07071, telephone 800-777-0505, www.umccorp.com Method Heat mold to 200 degrees for 10 minutes Combine Side A (resin) and pigment in a smooth-sided mixing cup Mix thoroughly with a spatula, scraping the sides and bottom to get thorough mixing Add Side B (catalyst). Working time will be about 10 to 12 minutes. Note the working time would be only 4 minutes if a 1:1 ratio of resin to catalyst mixture was used Mix thoroughly with a spatula, scraping the sides and bottom to get thorough mixing Vacuum de-gas until bubbles cease rising to surface Spray mold with Stoner silicone spray urethane mold release agent coating all surfaces Level mold Pour degassed liquid into a mold Level liquid and allow pigment to settle Allow to cure at room temperature for 3-4 hours minimum Illustrative Teaching Example 3

250 micron/90 Micron Composite Photoluminescent Phosphor

For a 1"×20" by 0.625" cast bar made from AG-UPL-250-90

Ingredients 50 grams of F-70, flexible, 70 Shore A, urethane elastomer, Side A (resin) from BJB Enterprises, 14791 Franklin Avenue, Tustin, Calif. 92780, telephone 714-734-8450, www.bjbindustries.com 45 grams of F-70, flexible, 70 Shore A, urethane elastomer, Side B (catalyst) from BJB Enterprises, 14791 Franklin Avenue, Tustin, Calif. 92780, telephone 714-734-8450, www.bjbindustries.com 42 grams nominal 250 micron photoluminescent pigment from United Mineral & Chemical Corp. (UMC), 1100 Valley Brook Avenue, Lyndhurst, N.J. 07071, telephone 800-777-0505, www.umccorp.com 42 grams nominal 90 micron photoluminescent pigment from United Mineral & Chemical Corp. (UMC), 1100 Valley Brook Avenue, Lyndhurst, N.J. 07071, telephone 800-777-0505, www.umccorp.com Method Heat mold to 200 degrees for 10 minutes Combine Side A (resin) and pigment in a smooth-sided mixing cup Mix thoroughly with a spatula, scraping the sides and bottom to get thorough mixing Add Side B (catalyst). Working time will be about 10 to 12 minutes. Note the working time would be only 4 minutes if a 1:1 ratio of resin to catalyst mixture was used Mix thoroughly with a spatula, scraping the sides and bottom to get thorough mixing Vacuum de-gas until bubbles cease rising to surface Spray mold with Stoner silicone spray urethane mold release agent coating all surfaces Level mold Pour degassed liquid into a mold Level liquid and allow pigment to settle Allow to cure at room temperature for 3-4 hours minimum Product Applications Damage Tolerant Exit Signs The phosphor composites described herein can be used to create bright, durable letters for damage resistant photoluminescent exit signs. Current actively lighted (incandescent, fluorescent or LED) signs are often vandalized by hitting them with sticks, bats and similar devices and rendering them inoperable and sometimes a safety hazard with live wire exposed to the touch. The flexibility of the polymer in which the phosphors are embedded is impact resistant, and electrical power sources are not required.

Emergency Egress Marking Systems

The phosphor composites described can be used to create Emergency Egress Marking Systems. Low Level Exit Path Marking Systems are generally located near the floor and are often damaged in day-to-day usage by being impacted by people, luggage, hand baggage, shoes, carts, etc. The robust, flexible phosphor composites described herein can withstand that damage and continue to function.

Aircraft, Railcar and Vehicle Exit Markings

The phosphor composites described can be used to create aircraft, railcar and vehicle exit markings. The robust, flexible polymer described herein can be curved to fit a curved surface. Accordingly, the phosphor composites of the invention can withstand damage and continue to function. The robust, flexible phosphor composites of the invention can be self extinguishing in horizontal flame spread tests as is required for such applications.

Navigational Markings

The phosphor composites described can be used to create photoluminescent navigational markings. By applying strips, sheets, slabs and other shaped pieces of the advanced photoluminescent materials described here to normally-lighted, occasionally-lighted or unlighted aids to navigations, recreational and commercial boaters and other marine operators can be made aware of the presence of the aids to navigation in low-light-level situations. The robust, flexible phosphor composites described herein can withstand damage from wind, waves and occasional contact with vessels while continuing to function.

Trail and Path Markers

The phosphor composites described can be used to create photoluminescent trail or path markings. By applying strips, sheets, slabs and other shaped pieces of the advanced photoluminescent materials described here along trails or paths recreational hikers and other users can be directed to trail heads, cabins, parking lots and other facilities. The robust, flexible phosphor composites described herein can withstand damage from contact with personnel, bicycles and other light vehicles while continuing to function.

Boat Fenders

The advanced photoluminescent materials described can be used to create photoluminescent vehicle fenders such as for example automotive or boat fenders. By using the advanced photoluminescent materials described here as an outer covering for an energy absorbing closed-cell polymer foam interior a photoluminescent boat fender can be created that can easily be seen in low light situations. The robust, flexible phosphor composites described herein can withstand abrasion and other damage from contact with boats, quay walls and pilings while continuing to function.

Wheel Chocks

The advanced photoluminescent materials described can be used to create photoluminescent wheel chocks. By using the advanced photoluminescent materials described here a photoluminescent wheel chock can be created that can easily be seen in low light situations such as unlighted aircraft taxi-ways and ramps. The robust, flexible phosphor composites described herein can withstand abrasion and other damage from contact with wheels, the ground and other vehicles boats while continuing to function.

Other Products

Other products suitable for the invention include those products shown in FIGS. 1-9 of U.S. Pat. No. 5,904,017 and shown in FIGS. 1-5 of U.S. Pat. No. 6,364,498. For products of this invention, the conventional photoluminescent components and elements shown in those patents are replaced with the phosphor composites of this invention having preferential loading of the phosphors near the light-emitting surfaces. Such a replacement provides for improved photoluminescent components on or in for example: stair treads, handrail covers, tactile warning strips, bumper guards, stair nosings, carpet cove caps, wall cove bases, advertising displays; instrumentation in aircraft, ships, trains, automobiles and other motive vehicular structures; displays on machines such as computers, appliances, and industrial process monitoring equipment; illuminated exit signs in buildings, stadiums, circus tents, etc.; directional indicators demarcating emergency egress pathways; and signs identifying the location of emergency equipment, such as first-aid kits, communications facilities, life rafts, etc.

Exemplary Exit Signs and Markings and Other Passively Illuminated Objects

Figure 5A:
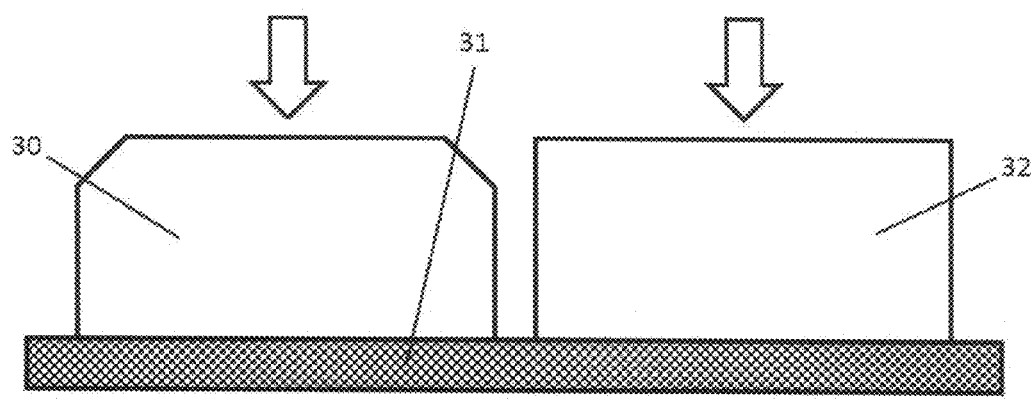
FIGS. 5A and 5B show depictions of both abrupt-edged, according to one embodiment of the invention as compared to a conventional tapered edge letter.
Figure 5B:
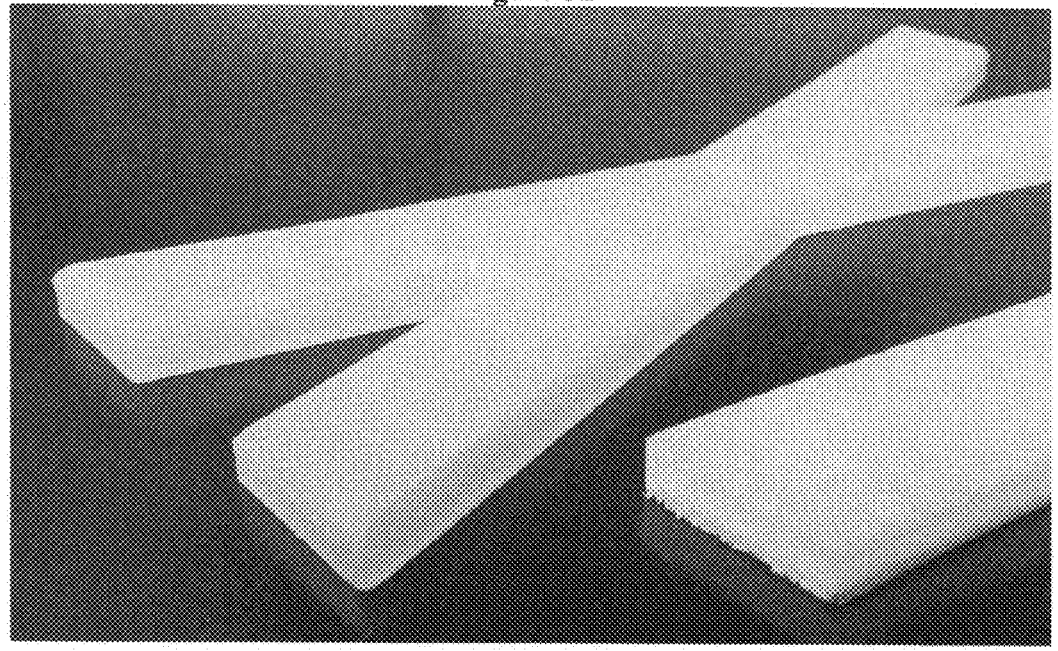

Described below are embodiments of this invention not only particularly useful for exit signs and egress markings but also applicable to other passively illuminated applications described herein. These embodiments include the shaping of the above-described photoluminescent objects or letters (e.g., the "E" and the "X" and the "I" and the "T" on an "EXIT" sign) with sharp, abrupt edges (i.e., edges formed at a junction of sidewall and light-emitting face of the letter) as opposed to chamfered or rounded edges. FIG. 5A is a schematic depiction of cross-sections of two photoluminescent letters mounted on a faceplate 31. FIG. 5B is a photographic depiction of a perspective view of two photoluminescent letters mounted on a faceplate 31. A conventional letter 30 with tapered edges to allow for easier removal from the mold is shown on the left. An abrupt-edged photoluminescent letter 32 according to one embodiment of the invention is shown on the right. The letters are shown attached to a front or back plate. The arrow indicates the normal direction of viewing;

In one aspect of this embodiment, the sidewall intersects the light-emitting exterior surface at a 90° angle within +/−10°, or within +/−5° or within +/−2° from normal to a face plate holding the photoluminescent objects, depending on the sharpness of edge desired. In one aspect of this embodiment, the sidewall and the light-emitting exterior surface intersect and form an abrupt edge with substantially no chamfering or rounding.

These embodiments for improved photoluminescent letters can include opaque or reflective sidewalls to prevent photoluminescent light from illuminating areas of a front plate adjacent to the letters. FIG. 6A is a depiction of an abrupt-edged photoluminescent letter 32 containing a sidewall coating 33 according to one embodiment of the invention. The letters are shown attached to a front or back plate 31. The arrow indicates the normal direction of viewing. Without the sidewall coating, inadvertent emission of visible light from the sidewalls of the letters tends to blur the outline of the letters when viewed from a distance under low-light conditions. When the sidewalls of conventional letters are coated, the area of the letter that emits light toward the viewer is reduced. When sidewall coatings are used, a paintable mold release agent is typically used rather than a silicone mold release agent. Exemplary sidewall coatings may include, but are not limited to, reflective or opaque paint, tape or thin film. A reflective sidewall coating can include a white paint, a metallized polyester film such as reflective Mylar®, a metallic film such as aluminum foil, or a high-performance thin reflector such as 3M Vikuity®. The sidewall coatings can be sprayed, glued, vapor deposited, vacuum molded, or attached with a pressure sensitive adhesive.

FIG. 6B is a depiction of an abrupt-edged photoluminescent letter 32 where the sidewall coating 33, according to one embodiment of the invention, has a tray-like element 38, that can be used as both a mold for casting the letter 32 and the sidewall coating 33. The letters 32 are shown attached to a front or back plate 31. The arrow indicates the normal direction of viewing;

FIG. 6C is a depiction of an abrupt-edged photoluminescent letter 32 where the sidewall coating 33, according to one embodiment of the invention, has a cookie-cutter-like element 39, into which letter 32 can be inserted. The cookie-cutter-like element 39 is captured by the letter 32 and serves as the sidewall coating 31 and in this embodiment surrounds only the sides of the letter. The letters 32 are shown attached to a front or back plate 31. The arrow indicates the normal direction of viewing. In another embodiment of this invention, the letters 32 and the cookie-cutter-like element 39 may be disposed between two sheets of glass or polymeric material, the rear sheet of which may be clear or colored, to produce an exit sign with letters that appear to "float."

Accordingly, on the embodiments of FIGS. 6B and 6C, an object is disposed in a frame 39 attached to the plate 31. The frame has an edge housing surrounding a peripheral edge of the object and is configured for the object to insert therein. The frame has a bottom fixture having an opening exposing the object to the plate.

These embodiments for improved photoluminescent letters can also include the placement of photoluminescent letters on a non-photoluminescent background. In one embodiment, the letters are surface mounted. In a second embodiment, the letters are recessed such that only a portion of the sidewall extends beyond the surface of the front or back plate. In a third embodiment, no portion of the sidewall extends beyond the surface of the front or back plate.

These embodiments for improved photoluminescent letters can also include the formation of photoluminescent letters having a reflective backing material. FIG. 7A is a depiction of photoluminescent letters having reflective backing materials. The letter in FIG. 7A has a reflective coating 34 disposed on its rear surface between the letter 32 and the face plate 31 according to one embodiment of the invention. In another embodiment, the letter in FIG. 7B has a reflective coating 34 disposed internal to the letter 32. The reflective backing material may be attached to the back surface of the letter or may be cast-molded internal to the letter, or the later may be formed using multiple layers of cast-molded urethanes where a particular layer may contain additives.

In one embodiment, a sheet of 2 mil metalized polyester film is inserted between layers of urethane. In a second embodiment, a sheet of 3M Victuity® high performance reflector film is inserted between layers of urethane.

In a third embodiment, a layer of urethane containing titanium white pigment is cast-molded onto the back of the letter. In a fourth embodiment, reflective glass beads are disposed on the backside of the photoluminescent letters by way of a layer of urethane.

In one aspect of this invention, the above-noted embodiments provide a way to approach, meet, or surpass the UL 924 lighting requirements. Underwriter Laboratories (UL) standard UL 924 requires: (1) eight people have to observe the sign at the appropriate viewing distance: 50', 75', or 100', (2) the observers each view six signs, the observers have ten seconds to view each sign, (3) each sign viewed will have letters showing either "EXIT" or "FYIT" (observers are briefed on this before the test), (4) and observers record which object appears to be seen. Of the six signs exhibited, three are EXIT and three are FYIT. Observers are not told that there will be three of each. When all eight observers have recorded all six results, and the average number of correct answers (score) is determined. If the average score is a 4.8 (or higher), the sign has passed. If the results are below a 4.8, a standard deviation is calculated along with a Lower Cutoff Limit (LCL). Once an LCL is determined, any observer who scored below the LCL is removed from consideration. An average score is taken again using the remaining observers. If the average score is 4.8 or above, the sign has passed. If the average score is below 4.8, the sign has failed and the test is terminated.

Figure 8:
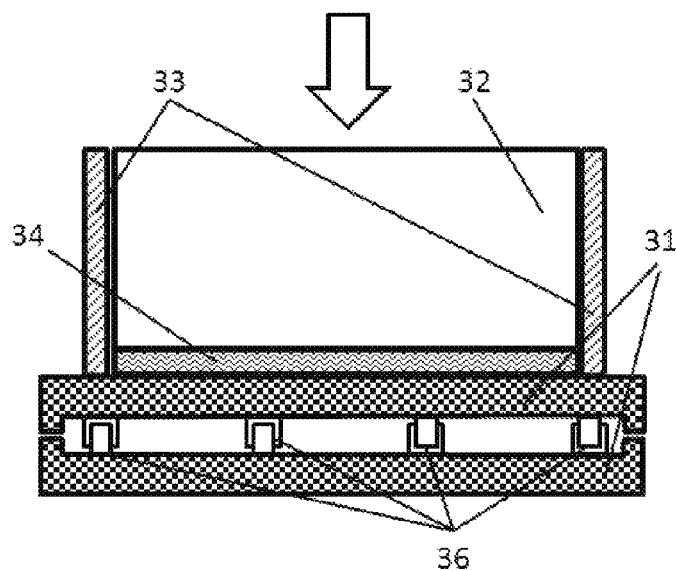
FIG. 8 shows a depiction of a mounting bracket of one embodiment of the invention holding the snap-together front and back plates.

In one embodiment of the invention, the EXIT signs have front and back plates with male and female snapping-together features to join the front and back plates together. This aspect of the invention permits the fasteners to be hidden from external view, presenting a clean appearance, and making difficult for a bystander to unbolt and steal the EXIT sign. FIG. 8 is a depiction of embodiment of the invention featuring two snap-together front plates 31. The snap-like features 36 are shown in FIG. 8.

Figure 9:
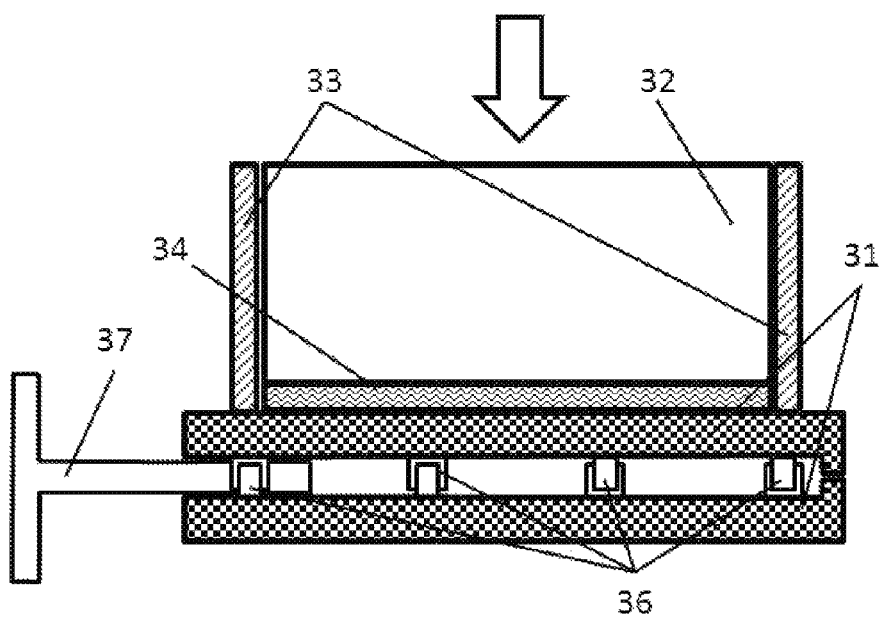
FIG. 9 is a depiction of a mounting bracket of one embodiment of the invention captured between two snap-together front plates.

FIG. 9 is a depiction of a mounting bracket 37 of one embodiment of the invention captured between two snap-together front plates 31. The features that permit the front and back halves of the signs to be snapped together with male and female halves disposed such that the two front plates may snap together or a front plate and a back plate may snap together.

Figure 10:
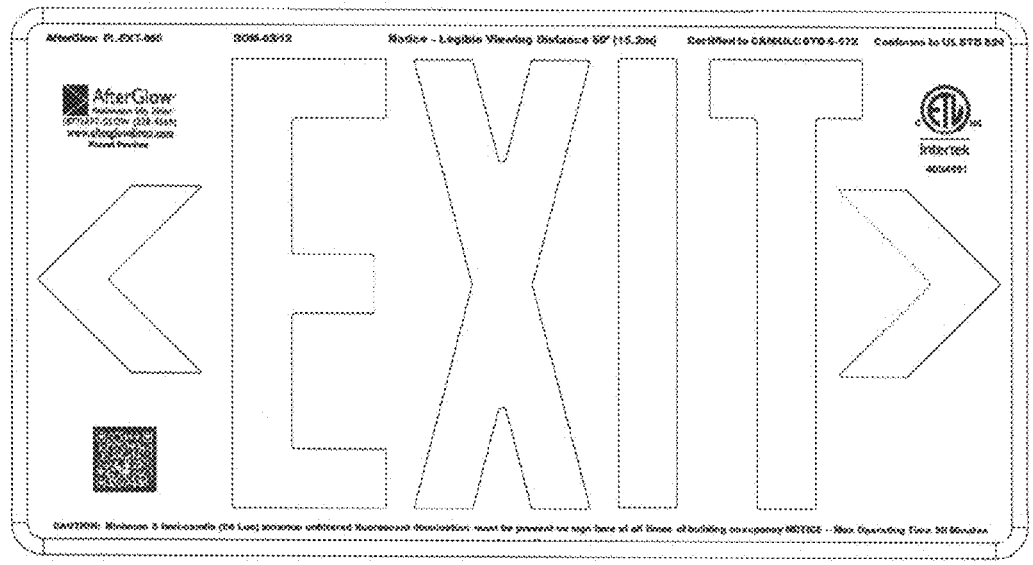
FIG. 10 is a drawing of a exit sign having a molded polymeric front plate with cast-molded photoluminescent letters affixed.

FIG. 10 is a drawing of a top view of an exit sign having a molded polymeric front plate with cast-molded photoluminescent letters affixed.

Figure 11:
FIG. 11 is a lights-on photograph of a photoluminescent exit sign of this invention.

FIG. 11 is a lights-on photograph of a photoluminescent exit sign of this invention. This photograph shows the color contrast which the photoluminescent exit sign of this invention exhibits under room light-type conditions, as the photoluminescent exit sign of this invention also function as a conventional sign.

Figure 12:
FIG. 12 is a lights-off photograph of a photoluminescent exit sign.

FIG. 12 is a lights-off photograph of a photoluminescent exit sign. The non-photoluminescent backing for the photoluminescent letters appears black, thereby providing excellent contrast for human perception.

All documents, patents, journal articles and other materials cited in the present application are hereby incorporated by reference.

Numerous modifications and variations of the invention are possible in light of the above teachings. It is therefore to be understood that within the scope of the appended claims, the invention may be practiced otherwise than as specifically described herein.

The invention claimed is:

1. A photoluminescent device comprising:
   a polymer matrix having a light-emitting exterior surface for emission of photoluminescent light therefrom; and
   a plurality of UV or visible-light excited phosphor particles included in the polymer matrix; and
   the phosphor particles having a concentration greater in an exterior region of the polymer matrix proximate the light-emitting exterior surface than in an interior region of the polymer matrix.

2. The device of claim 1, wherein the phosphor particles in the exterior region have a weight concentration that is 2-5 times larger than in the interior region.

3. The device of claim 1, wherein the phosphor particles in the exterior region have a weight concentration that is 5-50 times larger than in the interior region.

4. The device of claim 1, wherein the phosphor particles in the exterior region have a weight concentration that is 50-100 times larger than in the interior region.

5. The device of claim 1, wherein:
   the plurality of phosphor particles comprise first and second phosphor particles;
   said first phosphor particles have a larger size than the second phosphor particles; and
   in the exterior region, said first phosphor particles have a greater weight concentration than the second phosphor particles.

6. The device of claim 5, wherein the weight concentration of the first phosphor particles in the exterior region is 2-5 times larger than the second phosphor particles in the exterior region.

7. The device of claim 5, wherein the weight concentration of the first phosphor particles in the exterior region is 5-50 times larger than the second phosphor particles in the exterior region.

8. The device of claim 5, wherein the weight concentration of the first phosphor particles in the exterior region is 50-100 times larger than the second phosphor particles in the exterior region.

9. The device of claim 1, wherein the polymer matrix comprises a flexible polymer matrix including polymeric chain extenders and cross linkers.

10. The device of claim 1, wherein the polymer matrix comprises at least one of a transparent polymer, a urethane, a UV stabilizer.

11. The device of claim 1, wherein the phosphor particles comprise at least one of an alkali earth aluminate, an alkali earth silicate, zinc sulfides, alkaline earth silicate aluminates, strontium aluminate, and combinations thereof.

12. The device of claim 1, wherein the polymer matrix and the phosphor particles comprises a flame-retardant phosphor composite.

13. The device of claim 1, wherein the phosphor particles have a size range from 20 microns to 50 microns.

14. The device of claim 1, wherein the phosphor particles have a size range from 50 microns to 90 microns.

15. The device of claim 1, wherein the phosphor particles have a size range from 90 microns to 250 microns.

16. The device of claim 1, wherein the phosphor particles have a size range from 250 microns to 1000 microns.

17. The device of claim 1, wherein the phosphor particles have a nominal size of 1,000 microns.

18. The device of claim 1, further comprising a light source to illuminate the phosphor particles in the polymer matrix.

19. The device of claim 1, further comprising:
a plate holding the polymer matrix;
said polymer matrix comprising an object having said light-emitting exterior surface disposed opposite the plate, at least one sidewall intersecting the light-emitting exterior surface, and a bottom surface mounted to the plate.

20. The device of claim 19, wherein the object is shaped as a typographical character.

21. The device of claim 19, wherein the object comprises at least one of a cast-molded object, a molded or extruded tape; an extruded bar or other geometric shape.

22. The device of claim 21, wherein the object further comprises reflective elements included on a back-side-surface or included internally-molded with the object.

23. The device of claim 19, wherein the at least one sidewall intersects the light-emitting exterior surface at a 90° angle within +/−10°, within +/−5°, or within +/−2° of normal to the plate.

24. The device of claim 19, wherein the at least one sidewall and the light-emitting exterior surface intersect and form an abrupt edge with substantially no chamfering or rounding.

25. The device of claim 19, wherein at least one of the at least one sidewall or the bottom surface comprises a reflective coating.

26. The device of claim 19, wherein the at least one sidewall comprises a coating which is opaque or reflective of the photoluminescent light.

27. The device of claim 19, wherein the object is disposed in a frame attached to the plate.

28. The device of claim 27, wherein the frame comprises:
an edge housing surrounding a peripheral edge of the object and configured for the object to insert therein; and
a bottom fixture having an opening exposing the object to the plate.

29. A photoluminescent exit sign comprising:
at least two plates interlocked together;
at least one typographical character disposed on at least one of the plates;
said typographical character having,
a polymer matrix having a light-emitting exterior surface for emission of photoluminescent light therefrom,
a plurality of UV or visible-light excited phosphor particles included in the polymer matrix, and
the phosphor particles having a concentration greater in an exterior region of the polymer matrix proximate the light-emitting exterior surface than in an interior region of the polymer matrix.

30. The exit sign of claim 29, further comprising:
a mounting bracket for holding the two interlocked plates to a building component; and
said mounting bracket being optionally positionable at the left side, right side or top of the front plate, and
captured between the two plates.

* * * * *